United States Patent [19]

Abolins et al.

[11] Patent Number: 4,740,556
[45] Date of Patent: Apr. 26, 1988

[54] COPOLYMERS OF ALKENYL AROMATICS, UNSATURATED CARBOXYLIC ACID POLYPHENYLENE ETHER RESIN AND DIENE RUBBER

[75] Inventors: Visvaldis Abolins, Delmar; David F. Aycock, Glenmont, both of N.Y.

[73] Assignee: General Electric Company, Selkirk, N.Y.

[21] Appl. No.: 852,223

[22] Filed: Apr. 15, 1986

Related U.S. Application Data

[62] Division of Ser. No. 666,964, Oct. 31, 1984, abandoned.

[51] Int. Cl.$^4$ ............................................. C08L 71/04
[52] U.S. Cl. ........................... 525/68; 260/DIG. 24; 525/132; 525/133
[58] Field of Search ......................... 525/68, 132, 133

[56] References Cited

U.S. PATENT DOCUMENTS

| | | | |
|---|---|---|---|
| 3,383,435 | 5/1968 | Cizek | 260/874 |
| 3,887,646 | 6/1975 | Yonemitsu et al. | 260/876 R |
| 3,887,647 | 6/1975 | Yonemitsu et al. | 260/876 B |
| 4,035,447 | 7/1977 | Tonoki | 525/207 |
| 4,101,503 | 7/1978 | Cooper et al. | 260/42.18 |
| 4,228,046 | 10/1980 | Lee, Jr. | 525/68 |
| 4,269,950 | 5/1981 | Abolins | 525/68 |
| 4,412,051 | 10/1983 | de Man et al. | 526/293 |
| 4,478,974 | 10/1984 | Lee | 524/533 |

FOREIGN PATENT DOCUMENTS

| | | |
|---|---|---|
| 1149984 | 7/1983 | Canada . |
| 0013052 | 9/1980 | European Pat. Off. . |
| 986634 | 3/1965 | United Kingdom . |
| 2076831 | 12/1981 | United Kingdom . |

Primary Examiner—Christopher Henderson
Attorney, Agent, or Firm—Hedman, Gibson, Costigan & Hoare

[57] ABSTRACT

Thermoplastic, flame-resistant copolymers comprised of an alkenyl aromatic compound, a bromine-substituted alkenyl aromatic compound, an $\alpha,\beta$-unsaturated monocarboxylic acid and a diene rubber are described. The copolymers are prepared by polymerizing the comonomers in solution. The copolymers are admixable with other materials, both polymeric and non-polymeric, and the resulting compositions can be molded into articles of various shapes and sizes which exhibit improved paint adhesion.

8 Claims, No Drawings

COPOLYMERS OF ALKENYL AROMATICS, UNSATURATED CARBOXYLIC ACID POLYPHENYLENE ETHER RESIN AND DIENE RUBBER

This is a divisional of application Ser. No. 666,964 field Oct. 31, 1984, now abandoned.

BACKGROUND OF THE INVENTION

The styrene resins comprise a family of thermoplastic polymers known to be injection moldable into various shaped articles. These resins are normally highly flammable, however. As a way of decreasing the flammability, it has been proposed to incorporate halogen substituents, such as chlorine or bromine groups, into the polymer structure. For instance, British patent No. 986,634 discloses the preparation of chloro- and bromobenzenes which are said to be useful in the production of self-extinguishing polymers and copolymers.

DeMan, et al. in U.S. Pat. No. 4,412,051 describe fire-resistant copolymers of bromostyrene and one or more other monomers, including acrylonitrile, alphamethylstyrene and maleic anhydride. Methods of preparation are said to include bulk, solution, suspension, emulsion and precipitation. The preferred mode involves the addition of bromostyrene to an aqueous emulsion of acrylonitrile monomers, in which are also included an emulsifying agent and a free radical initiating compound.

It is known from Cizek, U.S. Pat. No. 3,383,435 and elsewhere in the patent literature that styrene resins can be utilized together with polyphenylene ether (oxide) resins in the form of molding compositions which exhibit beneficial properties as a result of the conjoint use. Compositions of a polyphenylene ether resin and a styrene resin in which the styrene resin can be modified to contain chloro or bromo substituents have also been described in Cooper, et al., U.S. Pat. No. 4,101,503, and in Yonemitsu, et al., U.S. Pat. Nos. 3,887,646 and 3,887,647.

Canadian Pat. No. 1,149,984 discloses a flame retardant polymer based on styrene, halogenated styrene, acrylonitrile and butadiene.

U.K. published application No. 2 076 831 describes molding compositions of a polyphenylene ether resin and a styrene-bromostyrene copolymer.

European published patent application No. 0 013 052 discloses fire-resistant copolymers of bromostyrene and a comonomer, preferably acrylonitrile.

SUMMARY OF THE INVENTION

The discovery has now been made of new thermoplastic polymeric materials, comprising units derived from an alkenyl aromatic compound, a brominated alkenyl aromatic compound, a diene rubber and an $\alpha, \beta$-unsaturated monofunctional carboxylic acid. The new polymer is inherently flame retardant as well as impact resistant, and it can be mixed with other materials, including other polymers such as polyphenylene ether resin in a wide range of proportions, to form molded polymer blends that are injection moldable into various articles and component parts.

The present invention embraces the aforementioned copolymer, a method of preparation for the polymer, a blend of the polymer with other polymeric and/or non-polymeric materials, and articles molded from the polymer blends, all of which are described in greater detail below.

The polymers of this invention are characterized by improved adhesion of paints and coatings to the polymer surface. The improvement in paint adhesion is shown in the accompanying examples which illustrate molding made from a blend of the polymer with polyphenylene ether (oxide) resin. The improved adhesion is highly advantageous for many commercial applications in which paints are to be applied for esthetic and other reasons.

DESCRIPTION OF THE INVENTION

The alkenyl aromatic monomers from which the present kinds of copolymers are derived in part are compounds having the formula

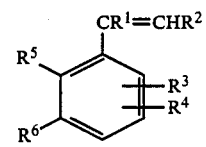

in which $R^1$ and $R^2$ are independently selected from the group consisting of lower alkyl or alkenyl groups having from 1 to 6 carbon atoms, and hydrogen; $R^3$ and $R^4$ are independently selected from the group consisting of bromo, hydrogen and lower alkyl having from 1 to 6 carbon atoms; and $R^5$ and $R^6$ are independently selected from the group consisting of hydrogen, bromo, lower alkyl or alkenyl groups having from 1 to 6 carbon atoms, or $R^5$ and $R^6$ may be concatenated together with hydrocarbyl groups to form a naphthyl group.

Compounds within the above formula include styrene and its homologs and analogs. Examples are, in addition to styrene, alpha-methyl styrene, para-methyl styrene, 2,4-dimethyl styrene, chlorostyrenes (mono-, di-, tri-, etc.), bromostyrenes (mono-,di-,tri-, etc.), p-tert.butylstyrene, p-ethylstyrene, vinyl xylene, divinylbenzene, and vinyl naphthalene. Styrene is the most preferred for purposes of this invention.

The bromine-substituted alkenyl aromatic commoner is selected from among compounds falling within the same formula as above, except that at least one of $R^3$, $R^4$, $R^5$ and $R^6$ is always bromine.

The $\alpha,\beta$-unsaturated monofunctional carboxylic acid, in general, will be selected from among those of the formula

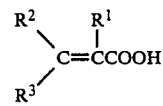

in which $R^1$ is hydrogen or lower alkyl, and $R^2$ and $R^3$ are independently hydrogen, lower alkyl or aryl, the term "lower alkyl" herein denoting alkyl having from 1 to 6 carbon atoms. Examples include acrylic acid, methacrylic acid, cinnamic acid, crotonic acid and isocrotonic acid. Acrylic acid is especially preferred for this invention.

The diene rubbers utilized in the formation of the modified polymers of this invention are rubbery polymers derived from conjugated diene rubber precursors, preferably diene compounds having from 4 to 8 carbon atoms, for example, 1,3-butadiene; 2-methyl-1,3-butadiene(isoprene); 1,3-pentadiene; 1,4-pentadiene;

1,3,5-hexatriene, etc. Most preferred for use in this invention are butadiene and isoprene, especially butadiene.

The copolymer is prepared by dissolving the desired relative amounts of the alkenyl aromatic, halogen-substituted alkenyl aromatic and α, β-unsaturated carboxylic acid comonomers in a mutual organic solvent or solvent mixture in which the diene rubber is also dissolved, then polymerizing the mixture at an appropriate elevated temperature, preferably in the range from about 90° C. to about 180° C., and preferably in sequence in multiple reaction zones ranging within such temperatures. The polymerization reaction is continued for a period of time sufficient to react all of the ingredients, or until the desired degree of monomer conversion is achieved.

Suitable reaction solvents may be selected from among alcohols, ketones, hydrocarbons, chlorohydrocarbons, nitrohydrocarbons, ethers, esters, amides, mixed ether-esters, and sulfoxides. Common organic solvents such as toluene, benzene, xylene, isopropanol and hexane are preferred.

The reaction proceeds readily at ambient pressure, but elevated pressures from 1 to 70 atmospheres may be used when operating at temperatures above the boiling point of the monomers or solvent.

The process may be conducted either batchwise or in a continuous manner.

The reaction is terminated in conventional fashion, such as by chilling the reaction mixture to lower the temperature, or by adding an antisolvent, e.g., methanol, to induce precipitation of the polymerized product form the reaction medium, or by removing the remaining unreacted monomers with use of conventional devolatilization equipment, such as flash tanks or devolatilizing extruders.

The resulting product, which appears to be a random or partially random copolymer of the added monomers with polybutadiene rubber particles of 0.1 to 50 microns in diameter dispersed throughout the matrix, is especially useful in admixture with other polymers as molding resins. The polymer may be prepared for such use by extruding through a single or twin screw extruder and cutting the extrudate into pellets or tablets which are readily admixable with other polymeric materials.

Preferred copolymers in accordance with this invention will comprise from about 40 to about 80 weight percent of styrene, from about 15 to about 50 weight percent of dibromostyrene, from about 0.5 to about 8 weight percent of acrylic acid, and from about 3 to about 20 weight percent of polybutadiene.

The copolymer of this invention is especially useful in widely variant proportions with polyphenylene ether resins, including those described in Hay, U.S. Pat. Nos. 3,306,874 and 3,306,875, in Stamatoff, U.S. Pat. Nos. 3,257,357 and 3,257,358, and elsewhere in the patent literature.

Preferably, the above described polymer is used in blends with polyphenylene ether homopolymers or copolymers having units of the formula

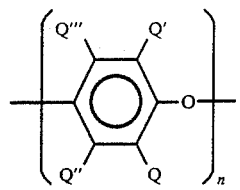

in which Q, Q', Q" and Q''' are independently selected from the group consisting of hydrogen, halogen, hydrocarbon radicals, halohydrocarbon radicals, hydrocarbonoxy radicals and halohydrocarbonoxy radicals; and n represents the total number of monomer units and is an integer of at least about 20, and more usually at least 50.

Especially preferred for use in the compositions of this invention are polyphenylene ether homopolymers having alkenyl substituents in the two positions ortho to the oxygen ether atom, that is, those of the above formula in which Q and Q' are alkyl, particularly alkyl having from 1 to 4 carbon atoms. Most preferred is poly(2,6-dimethyl-1,4-phenylene) ether resin.

The copolymer described above may be admixed with such polyphenylene ether resins in virtually all amounts, but preferably in a weight ratio between 85:15 and 15:85.

Conventional additives may also be added to the blends, in the usual amounts, to affect the chemical and physical properties. Such additives include flame retardants, plasticizers, impact strength improvers, reinforcing agents (e.g., glass fibers), mineral fillers (e.g., clay), stabilizers, antioxidants, processing aids, colorants (e.g., pigments, dyes, etc.), and so forth.

The blends may be extruded and/or molded into articles of various shapes and sizes and, in general, they are suitable for the same commercial purposes for which engineering thermoplastics generally and polyphenylene ether resin compositions particularly are known.

Among the additives which can be employed with the described copolymer and copolymer blends of this invention, special mention is made of flame retardants, plasticizers and impact strength improvers. The flame retardant agent or agents, if used, can be selected from among materials containing chemical elements known for their ability to impart flame resistance, for example, bromine, chlorine, antimony, phosphorus and nitrogen. Included among such materials are various aliphatic and aromatic phosphates and phosphonates; halogenated (e.g., brominated and/or chlorinated) organic compounds; halogenated organic compounds in admixture with antimony compounds, such as antimony oxide; halogen-containing compounds in admixture with phosphorus compounds containing phosphorus-nitrogen bonds; halogenated, e.g., chlorinated or brominated, polymeric flame retardant agents such as brominated or chlorinated polystyrenes and polycarbonates, and so forth.

Especially useful are aromatic phosphate compounds having the formula

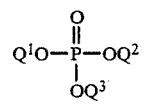

in which each Q represents the same or a different radical selected independently from among alkyl, cycloalkyl, aryl, alkyl-substituted aryl, aryl-substituted alkyl, halogen and hydrogen, with at least one Q always being aryl.

Examples include phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, and bis(2-ethylhexyl)phenyl phosphate.

Especially preferred is triphenyl phosphate and isopropylated triphenyl phosphate, which are capable of functioning as both plasticizer and flame retardant in the present blends.

Impact strength improvers suitable for use in this invention include those polymeric materials often used to upgrade the impact resistance of polyphenylene ether resins, examples of which are linear block, random block, graft and radial teleblock copolymers of styrene and a diene rubber, species of which are the Kraton ® rubbers of Shell Chemicals, the Solprene ® materials of Phillips Petroleum Co. and the Stereon ® polymers of Firestone Co.

The polymer, composition and process of this invention are illustrated in the following examples.

EXAMPLE 1

This example illustrates the preparation of a copolymer in accordance with this invention comprising units of styrene, dibromostyrene, polybutadiene and acrylic acid.

A reaction mixture comprising 58.4 parts by weight of styrene, 12.5 parts by weight of toluene, 17.8 parts by weight of dibromostyrene, 7.4 parts by weight of polybutadiene rubber (Taktene 1202, Polysar Co.), 2.9 parts by weight of acrylic acid and 1 part by weight of mineral oil was prepared and pumped continuously at a rate of 10 milliliters per minute to a reactor train consisting of three reactors connected in series. Each reactor contained three temperature-controlled agitated zones baffled to retard back-mixing. The temperatures in the reactor zones were controlled as follows:

|  | Zone | Temperature, °C. |
| --- | --- | --- |
| First | 1 | 112 |
| Reactor | 2 | 118 |
|  | 3 | 124 |
| Second | 4 | 119 |
| Reactor | 5 | 122 |
|  | 6 | 125 |
| Third | 7 | 132 |
| Reactor | 8 | 147 |
|  | 9 | 150 |

The product recovered from the last (third) reactor was devolatilized with a Leistritz twin-screw extruder, and pelletized.

EXAMPLE 2

This example illustrates the preparation of a thermoplastic molding composition in accordance with this invention.

A mixture of 95 parts by weight of the copolymer from Examples 1 and 5 parts by weight of antimony oxide was compounded using a 28 mm. Werner Pfleiderer twin screw extruder set for a melt temperature of about 570° F. and vented to a vacuum equivalent to 10 inches of mercury. The extrudate was pelletized, and the pellets were molded into test specimens at a melt temperature of 400° F. using a 4 ounce Newbury injection molding machine(mold temp. 150° F.). The molded specimens were evaluated for physical properties, which were as follows:

| | |
| --- | --- |
| Tensile strength | 5,800 psi |
| Heat distortion temperature, under pressure at 264 psi | 185° F. |
| Flame resistance, 1/16 inch-thick specimen, UL 94 test conditions | V-O (1.0 second, ave. burning time) |

EXAMPLE 3

A composition in accordance with this invention comprising 97 parts by weight of the copolymer from Example 1, 17 parts by weight of poly(2,6-dimethyl-1,4-phenylene) ether resin (PPO ®, General Electric Co.) and parts by weight of antimony oxide was prepared and molded. The conditions were the same as in Example 2, except that the molding temperature was increased to 500° F. for the melt. The molded composition had the

| | |
| --- | --- |
| Tensile strength | 6,900 psi |
| Heat distortion temp. at 264 psi | 208° F. |
| Flame resistance 1/16", UL-94 | V-O (1.0 second, ave. burning time) |

As can be seen, the addition of a polyphenylene ether resin to the blend of Example 2 improves the tensile strength (6900 psi, versus 5800 psi), and the heat distortion temperature (208° F., versus 185° F.)

The same composition was compared with two control blends for paintability, that is, the adhesion of an applied paint to the molded surface. Control blend A contained 40 parts by weight of poly(2,6-dimethyl-1,4-phenylene)ether resin (PPO) and 60 parts by weight of high impact polystyrene(American Hoechst Co.). Control B contained 97 parts by weight of styrene-dibromostyrene copolymer prepared by the same procedure as in Example 1 except without acrylic acid, 17 parts by weight of poly(2,6-dimethyl-1,4-phenylene)ether resin (PPO) and 5 parts by weight of antimony oxide.

Four conventional paint systems were used for the surface adhesion evaluation, as follows:

Red Spot 268 SL20837

1. Reduced 1:1 by weight/volume with an organic solvent-based polyurethane (SV3765, Red Spot Paint and Varnish Co.)
2. Air atomized under pressure at 35 psi.
3 Force dried for 15 minutes at 150° F.
4. Dry film thickness 1.0 mils.

Red Spot 222 LE 9581(Solvent based, catalyzed, high gloss polyurethane

1. Catalyzed to extent of 15% with LE 9425, Red Spot Paint and Varnish Co.
2. Reduced 50% by volume/weight with solvent blend SV 3148, Red Spot Paint and Varnish Co.
3. Air atomized under pressure at 35 psi.
4. Force dried for 20 minutes at 150° F.
5. Dry film thickness 1.5 mils.

Red Spot 215 LE 9647 (Solvent based, catalyzed polyurethane)

1. Catalyzed to extend of 12.5% with LE 9425, Red Spot Paint and Varnish Co.
2. Reduced 1:1 by volume/weight with solvent blend SV 3761, Red Spot Paint and Varnish Co.
3. Air atomized under pressure at 50 psi.
4. Force dried for 20 minutes at 150° F.
5. Dry film thickness 0.9 mils.

Red Spot 231 WLE0767 (Water reducible)

1. Reduced 10% by volume/weight with water.
2. Air atomized under pressure at 50 psi.
3. Force dried for 30 minutes at 150° F.
4. Dry film thickness 1.6 mils.

Adhesion of the paint film to the molded substrate was evaluated after conditioning at room temperature (23° to 25° C.) for 72 hours followed by 10 days of immersion in water. Molded test plaques were painted and, after drying, the painted surface was cross-hatched with a knife, then pull-tested with adhesion tape. If the tape was paint-free, the test specimen was rated "5" (or excellent, best adhesion). If a great deal of paint adhered to the tape, the test specimen was rated "0" (or very poor, no paint adhesion to test specimen surface). The results are shown in the Table.

TABLE

| SAMPLE | Red Spot 268 SL20837 | | Red Spot 222 LE9581N | | Red Spot 215 LE9647 | | Red Spot 213 WLE 0767 | |
|---|---|---|---|---|---|---|---|---|
| | Initial | After 10 days | Initial | After 10 days | Initial | After 10 days | Initial | After 10 days |
| This Invention | 4 | 5 | 5 | 5 | 5 | 5 | 5 | 5 |
| Control A | 0 | 0 | 0 | 0 | 5 | 0 | 5 | 5 |
| Control B | 0 | 0 | 5 | 5 | 5 | 5 | 5 | 5 |

As is shown, the composition in accordance with the invention provides better paint adhesion in all of the cases in comparison with Control A, and it was comparable in all cases to Control B.

EXAMPLE 4

The procedure described in Example 3 was modified by adding a plasticizer and an impact modifier to the blend. The composition consisted of 97 parts by weight of the Example 1 copolymer (polystyrene-polydibromostyrene-polybutadiene-polyacrylic acid), 5 parts by weight of antimony oxide, 15 parts by weight of poly (2,6-dimethyl1,4-phenylene) ether resin, 5 parts by weight of a radial teleblock copolymer of styrene and butadiene (impact modifier, Solprene® 411, Phillips Petroleum Co.), and 5 parts by weight of isopropylated triphenyl phosphate plasticizer (Kronitex®50, FMC Corp.). The molded composition exhibited the following properties:

| Tensile strength | 6,500 psi |
| Heat distortion temp. | 188° F. |
| Flame resistance 1/16", UL-94 | V-O (1.0 second, ave. burning time) |

All of the above mentioned patents and/or publications are incorporated herein by reference.

Other modifications and variations of the invention are possible and will occur to those skilled in the art in view of the foregoing disclosure. For instance, a polyphenylene ether copolymer, such as poly(2,6-dimethyl-co-2,3,6-trimethyl-1,4-phenylene)ether may be used in place of poly(2,6-dimethyl-1,4-phenylene) ether. Methacrylic acid may be used in place of acrylic acid. An EPDM rubber modified polystyrene may be used in place of the polybutadiene rubber modified material. The compositions may be modified to include glass fibers and/or mineral filler. Still other adaptions are possible. It should be understood, therefore, that changes may be made in the particular embodiments shown without departing from the scope of the invention defined in the appended claims.

We claim:

1. A thermoplastic composition comprising a flame retardant copolymer consisting essentially of units derived from an alkenyl aromatic compound, a bromosubstituted alkenyl aromatic compound, an α, β-unsaturated monofunctional carboxylic acid, a diene rubber and a polyphenylene ether resin.

2. A composition according to claim 1, in which the polyphenylene ether resin comprises units of the formula

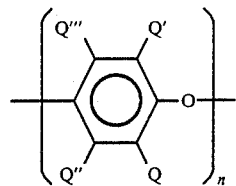

in which Q, Q', Q" are independently selected from the group consisting of hydrogen, halogen, hydrocarbon radicals, halohydrocarbon radicals, hydrocarbonoxy radicals and halohydrocarbonoxy radicals, and n represents the total number of monomer units and is an integer of at least about 20.

3. A composition according to claim 2, in which the polyphenylene ether resin is poly(2,6-dimethyl1,4-phenylene) ether resin.

4. A composition according to claim 1, which further comprises said copolymer, a polyphenylene ether resin, a polymeric impact modifier for the polyphenylene ether resin consisting of a styrene copolymer, and a plasticizer.

5. A composition according to claim 1, which further comprises a styrene-dibromostyrene-acrylic acid-polybutadiene copolymer, a poly(2,6-dimethyl1,4-phenylene) ether resin, a radial teleblock copolymer of styrene and butadiene and isopropylated triphenyl phosphate.

6. An article molded from the composition of claim 1.

7. An article molded from the composition of claim 3.

8. A thermoplastic composition comprising a flame retardant copolymer and polyhenylene ether resin wherein said flame retardant copolymer comprises from about 40 to about 80 weight percent of styrene, from about 15 to about 50 weight percent of dibromostyrene, from about 0.5 to about 8 percent of acrylic acid, and from about 3 to about 20 weight percent of polybutadiene.

* * * * *